US012051955B2

(12) United States Patent
Oonishi et al.

(10) Patent No.: US 12,051,955 B2
(45) Date of Patent: Jul. 30, 2024

(54) VIBRATION GENERATOR WITH TWO S-SHAPED ELASTIC BEAM PARTS OVERLAPPING 180 DEGREES

(71) Applicant: KABUSHIKI KAISHA TOSHIBA, Tokyo (JP)

(72) Inventors: Atsuro Oonishi, Kawasaki Kanagawa (JP); Hiroshi Takahashi, Yokohama Kanagawa (JP); Takamitsu Sunaoshi, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 72 days.

(21) Appl. No.: 17/187,442

(22) Filed: Feb. 26, 2021

(65) Prior Publication Data

US 2022/0085709 A1    Mar. 17, 2022

(30) Foreign Application Priority Data

Sep. 16, 2020  (JP) ................................ 2020-155106

(51) Int. Cl.
*H02K 33/02*    (2006.01)
*B06B 1/04*    (2006.01)

(52) U.S. Cl.
CPC ............. *H02K 33/02* (2013.01); *B06B 1/045* (2013.01)

(58) Field of Classification Search
CPC ...... H02K 35/00; H02K 35/02; H02K 11/046; H02K 7/1869; H02K 7/1876; H02K 41/02; H02K 33/00; H02K 33/18; H02K 33/16; H02K 33/02; H02J 1/00; H02N 11/00; H02N 11/002

USPC .. 310/12, 12.12, 12.01, 12.03, 12.13, 12.16, 310/12.26, 25, 15–31
See application file for complete search history.

(56) References Cited

U.S. PATENT DOCUMENTS 4,412,317 A * 10/1983 Asjes ..................... G01V 1/181
  367/187
6,326,706 B1 * 12/2001 Zhang ................... F04B 35/045
  310/12.32

(Continued)

FOREIGN PATENT DOCUMENTS

JP    2010-525779 A    7/2010
JP       5248598 B2    7/2013

(Continued)

OTHER PUBLICATIONS

JP5461381B2 English Translation.*

*Primary Examiner* — Maged M Almawri
(74) *Attorney, Agent, or Firm* — Finnegan, Henderson, Farabow, Garrett & Dunner, LLP

(57) ABSTRACT

According to one embodiment, a vibration generator includes first and second integrated elastic support bodies, a vibrator, and a coil. Each of the first and second integrated elastic support bodies includes an elastic beam part configured to undergo elastic deformation, and a support part supporting the elastic beam part, the elastic beam part and support part being integrally formed. The vibrator includes a magnet and a magnetic material, and is interposed between the first and second integrated elastic support bodies and supported so as to vibrate. The coil is located inside the vibrator, and interposed and supported between the first integrated elastic support body and the second integrated elastic support body.

12 Claims, 8 Drawing Sheets

(56) References Cited

U.S. PATENT DOCUMENTS

| | | | | |
|---|---|---|---|---|
| 6,501,357 B2* | 12/2002 | Petro | H02K 33/16 | 335/229 |
| 6,644,943 B1* | 11/2003 | Lilie | F04B 35/045 | 417/418 |
| 6,737,780 B1* | 5/2004 | Fisher | H02K 1/17 | 310/154.14 |
| 6,983,923 B2* | 1/2006 | Fukui | F16K 31/082 | 335/229 |
| 7,078,832 B2* | 7/2006 | Inagaki | H02K 7/14 | 335/238 |
| 7,449,803 B2* | 11/2008 | Sahyoun | H02K 33/16 | 310/23 |
| 7,573,163 B2* | 8/2009 | Tu | H01F 7/021 | 310/12.21 |
| 7,586,220 B2* | 9/2009 | Roberts | H02K 1/34 | 290/1 R |
| 7,671,493 B2* | 3/2010 | Takashima | G06F 3/016 | 310/15 |
| 7,791,456 B2* | 9/2010 | Miura | B06B 1/045 | 340/407.1 |
| 7,911,098 B2* | 3/2011 | Lee | H02K 33/16 | 310/20 |
| 7,948,124 B1* | 5/2011 | Waters | H02K 35/00 | 310/36 |
| 8,013,480 B2* | 9/2011 | Bang | B06B 1/045 | 310/12.33 |
| 8,097,991 B2* | 1/2012 | Masami | H02K 33/16 | 310/15 |
| 8,188,623 B2* | 5/2012 | Park | H02K 33/16 | 310/12.01 |
| 8,278,786 B2* | 10/2012 | Woo | H02K 33/16 | 310/15 |
| 8,288,899 B2* | 10/2012 | Park | H02K 33/16 | 310/71 |
| 8,314,519 B2* | 11/2012 | Eckstein | F16H 25/20 | 310/12.01 |
| 8,446,055 B2* | 5/2013 | Jun | H02K 33/16 | 310/23 |
| 8,456,032 B2* | 6/2013 | Hochberg | H02K 7/06 | 290/43 |
| 8,492,937 B2* | 7/2013 | Roberts | H02K 1/34 | 310/32 |
| 8,575,794 B2* | 11/2013 | Lee | H02K 33/18 | 310/15 |
| 8,593,017 B2* | 11/2013 | Stefanini | H02K 35/02 | 290/1 R |
| 8,629,569 B2* | 1/2014 | Roberts | H02K 35/06 | 290/1 R |
| 8,736,086 B2* | 5/2014 | Yang | H02K 35/02 | 290/1 R |
| 9,356,499 B2* | 5/2016 | Kinoshita | H02K 35/02 | |
| 9,461,530 B2* | 10/2016 | Wasenczuk | B06B 1/04 | |
| 9,695,806 B2* | 7/2017 | Van Brunt | H02K 33/16 | |
| 9,815,085 B2* | 11/2017 | Chun | G06F 3/016 | |
| 9,906,109 B2* | 2/2018 | Endo | H02K 33/16 | |
| 10,079,531 B2* | 9/2018 | Xu | H02K 5/04 | |
| 10,170,969 B2* | 1/2019 | Ohishi | H02K 7/1876 | |
| 10,307,791 B2* | 6/2019 | Xu | B06B 1/045 | |
| 10,328,461 B2* | 6/2019 | Xu | B06B 1/045 | |
| 10,411,612 B2 | 9/2019 | Oonishi et al. | | |
| 10,486,196 B2* | 11/2019 | Chai | B06B 1/045 | |
| 10,615,726 B2 | 4/2020 | Oonishi et al. | | |
| 10,622,538 B2* | 4/2020 | Zhang | H01L 41/083 | |
| 10,710,115 B2* | 7/2020 | Huang | H02K 33/02 | |
| 10,811,949 B2* | 10/2020 | Oonishi | H02J 7/32 | |
| 11,031,857 B2* | 6/2021 | Wasenczuk | H02N 2/186 | |
| 11,152,843 B2* | 10/2021 | Wasenczuk | H02K 1/34 | |
| 11,418,099 B2* | 8/2022 | Takahashi | B06B 1/045 | |
| 2004/0119343 A1* | 6/2004 | Ueda | G10K 9/22 | 310/12.31 |
| 2005/0225181 A1* | 10/2005 | Tu | H02K 35/00 | 310/15 |
| 2006/0002577 A1* | 1/2006 | Won | B06B 1/045 | 381/396 |
| 2007/0052302 A1* | 3/2007 | Cheung | B82Y 25/00 | 310/12.25 |
| 2007/0085425 A1* | 4/2007 | Hirashima | H02K 33/16 | 310/15 |
| 2007/0182257 A1* | 8/2007 | Miura | H04R 9/02 | 310/23 |
| 2008/0265692 A1* | 10/2008 | Roberts | H02K 1/34 | 310/15 |
| 2009/0250032 A1* | 10/2009 | Fullerton | H03K 3/45 | 123/143 B |
| 2010/0327672 A1* | 12/2010 | Roberts | H02K 1/34 | 310/25 |
| 2011/0018364 A1* | 1/2011 | Kim | H02K 33/18 | 310/20 |
| 2011/0018365 A1* | 1/2011 | Kim | B06B 1/045 | 310/20 |
| 2011/0062803 A1* | 3/2011 | Lee | H02K 33/18 | 310/29 |
| 2011/0068640 A1* | 3/2011 | Choi | H02K 5/04 | 310/25 |
| 2011/0089773 A1* | 4/2011 | Choi | H02K 33/16 | 310/25 |
| 2011/0133577 A1* | 6/2011 | Lee | H02K 33/18 | 310/15 |
| 2011/0193426 A1* | 8/2011 | Chung | H02K 33/16 | 310/25 |
| 2011/0198948 A1* | 8/2011 | Keisuke | H02K 5/225 | 310/25 |
| 2011/0198949 A1* | 8/2011 | Furuich | H02K 33/16 | 310/25 |
| 2011/0291497 A1* | 12/2011 | Choi | H02K 33/18 | 310/25 |
| 2012/0032535 A1* | 2/2012 | Park | H02K 35/02 | 310/25 |
| 2012/0098380 A1* | 4/2012 | Wang | H02K 15/0442 | 310/260 |
| 2012/0146557 A1* | 6/2012 | Pyo | H02P 31/00 | 310/25 |
| 2012/0169148 A1* | 7/2012 | Kim | H02K 33/16 | 310/25 |
| 2012/0212097 A1* | 8/2012 | Wasenczuk | B06B 1/04 | 310/216.001 |
| 2012/0293022 A1* | 11/2012 | Park | B06B 1/045 | 310/25 |
| 2013/0033128 A1* | 2/2013 | Yoon | H02K 33/18 | 310/25 |
| 2013/0033129 A1* | 2/2013 | Hong | B06B 1/045 | 310/25 |
| 2013/0043766 A1* | 2/2013 | Takahashi | H04R 17/00 | 310/326 |
| 2013/0099600 A1* | 4/2013 | Park | B06B 1/045 | 310/15 |
| 2013/0285479 A1* | 10/2013 | Kinoshita | H02K 35/02 | 310/12.12 |
| 2013/0342032 A1* | 12/2013 | Laurent | H02K 35/04 | 310/306 |
| 2014/0062225 A1* | 3/2014 | Kim | H02K 33/00 | 310/15 |
| 2014/0077628 A1* | 3/2014 | Yamada | H02K 33/12 | 310/12.16 |
| 2014/0084710 A1* | 3/2014 | Endo | H02K 33/16 | 310/25 |
| 2014/0103751 A1* | 4/2014 | Furukawa | H02K 35/02 | 310/25 |
| 2014/0132089 A1* | 5/2014 | Jeon | H02K 33/18 | 310/14 |
| 2014/0265651 A1* | 9/2014 | Kim | H02K 33/16 | 310/25 |
| 2015/0194870 A1* | 7/2015 | Kim | H02K 33/18 | 310/25 |
| 2016/0126821 A1* | 5/2016 | Iwaki | H02K 7/08 | 310/12.21 |
| 2016/0149517 A1* | 5/2016 | Choi | H02N 1/04 | 427/58 |

(56) References Cited

U.S. PATENT DOCUMENTS

| | | | | |
|---|---|---|---|---|
| 2016/0149518 A1* | 5/2016 | Wang | ..................... | F03B 13/14 |
| | | | | 310/310 |
| 2016/0190903 A1* | 6/2016 | Ohishi | ................... | H02K 35/04 |
| | | | | 310/28 |
| 2017/0033653 A1* | 2/2017 | Wang | ..................... | H02K 33/16 |
| 2017/0033673 A1* | 2/2017 | Wang | ..................... | H02K 33/16 |
| 2017/0288523 A1* | 10/2017 | Katada | ................. | H02P 25/032 |
| 2017/0346376 A1* | 11/2017 | Kim | ....................... | H02K 15/02 |
| 2018/0026514 A1* | 1/2018 | Mao | ....................... | H02K 5/225 |
| | | | | 310/12.16 |
| 2018/0056329 A1* | 3/2018 | Akanuma | .............. | H02K 33/16 |
| 2018/0297074 A1* | 10/2018 | Huang | .................... | B06B 1/045 |
| 2019/0293601 A1 | 9/2019 | Sugiyama et al. | | |
| 2019/0296627 A1* | 9/2019 | Takahashi | .............. | H02K 35/02 |
| 2019/0313181 A1 | 10/2019 | Fujimori et al. | | |
| 2021/0028679 A1* | 1/2021 | Wasenczuk | .............. | H02K 1/34 |

FOREIGN PATENT DOCUMENTS

| | | | | |
|---|---|---|---|---|
| JP | 5461381 B2 * | 4/2014 | ............ | H02K 33/16 |
| JP | 2014-79118 A | 5/2014 | | |
| JP | 2017-229118 A | 12/2017 | | |
| JP | 2018-110315 A | 7/2018 | | |
| JP | 2018-157724 A | 10/2018 | | |
| JP | 2019-22409 A | 2/2019 | | |
| JP | 2019-42710 A | 3/2019 | | |
| JP | 2019-168331 A | 10/2019 | | |
| JP | 2019-170118 A | 10/2019 | | |

\* cited by examiner

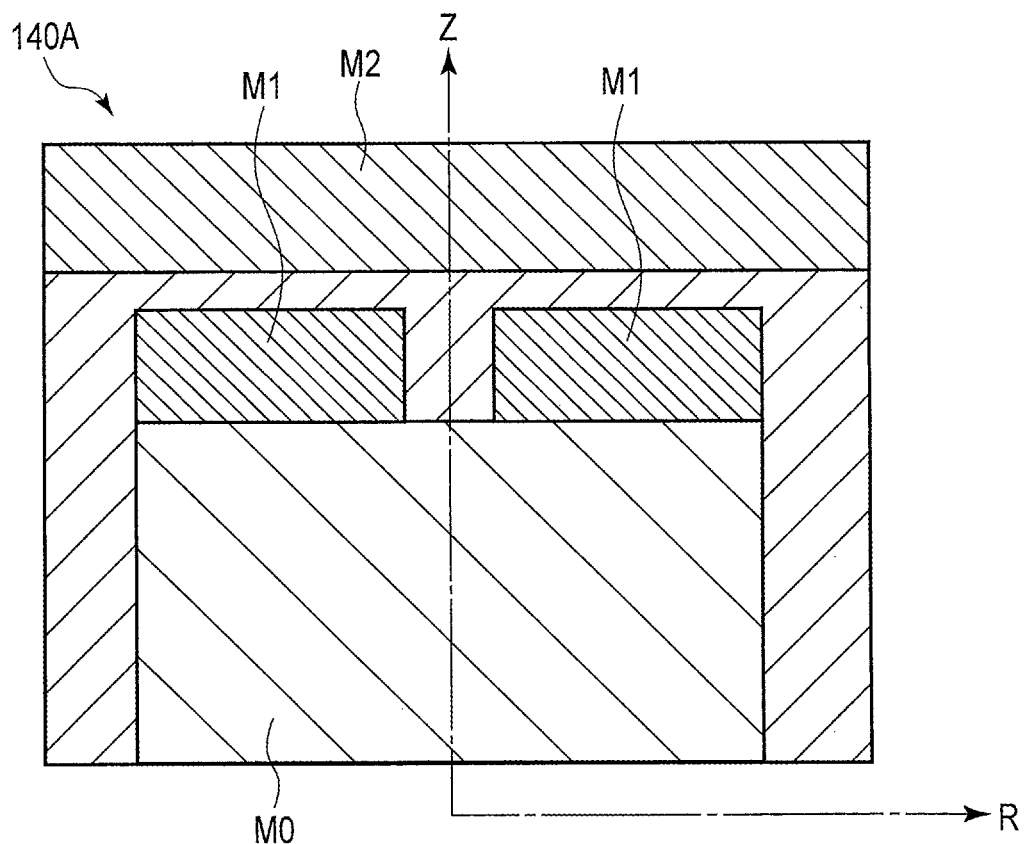
F I G. 9
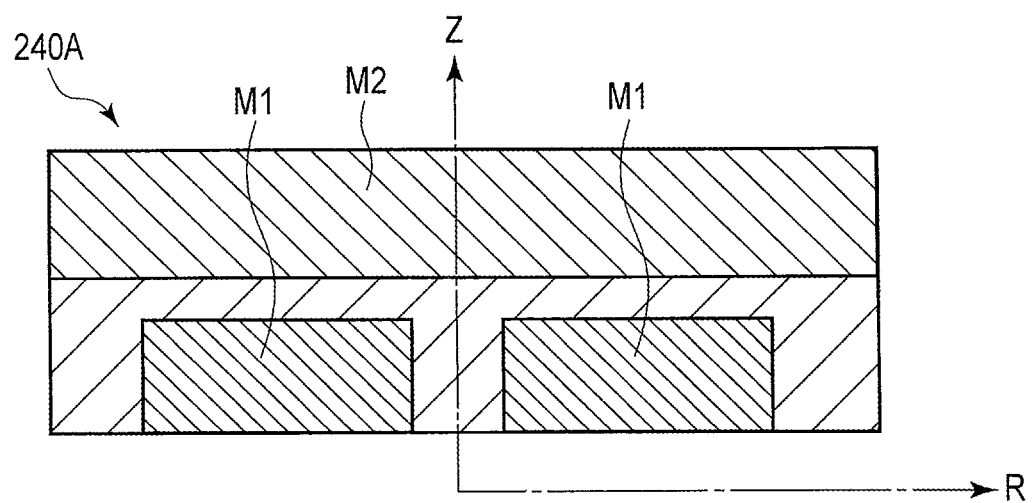
F I G. 10

VIBRATION GENERATOR WITH TWO S-SHAPED ELASTIC BEAM PARTS OVERLAPPING 180 DEGREES

CROSS-REFERENCE TO RELATED APPLICATIONS

This application is based upon and claims the benefit of priority from Japanese Patent Application No. 2020-155106, filed Sep. 16, 2020, the entire contents of which are incorporated herein by reference.

FIELD

Embodiments described herein relate generally to a vibration generator.

BACKGROUND

A vibration generator generates power by utilizing environmental vibrations (for example, vibrations caused by automobiles and trains, and vibrations caused by rain hitting the ground). Electric power generated by the vibration generator is expected to replace a power source (for example, a battery) used for devices such as sensors. In order to improve power generating performance of the vibration generator, it is necessary to reduce mechanical attenuation rates.

BRIEF DESCRIPTION OF THE DRAWINGS

FIG. 9 is a diagram schematically showing a main manufacturing process of the upper side integrated elastic support body according to the first embodiment shown in FIG. 1.

FIG. 10 is a diagram schematically showing a main manufacturing process of an upper side integrated elastic support body according to the second embodiment shown in FIG. 8.

DETAILED DESCRIPTION

According to one embodiment, a vibration generator includes a first integrated elastic support body, a second integrated elastic support body, a vibrator, and a coil. The first integrated elastic support body includes an elastic beam part configured to undergo elastic deformation, and a support part supporting the elastic beam part, the elastic beam part and the support part being integrally formed. The second integrated elastic support body includes an elastic beam part configured to undergo elastic deformation, and a support part supporting the elastic beam part, the elastic beam part and the support part being integrally formed. The vibrator includes a magnet and a magnetic material. The vibrator is interposed between the first integrated elastic support body and the second integrated elastic support body, and supported so as to vibrate. The coil is located inside the vibrator. The coil is sandwiched and supported between the first integrated elastic support body and the second integrated elastic support body.

Hereinafter, embodiments will be described with reference to the drawings. Throughout the description of embodiments below, the same configurations will be denoted by the same reference symbols, and redundant descriptions will be omitted. The drawings are schematically or conceptually illustrated.

First Embodiment

Figure 1:
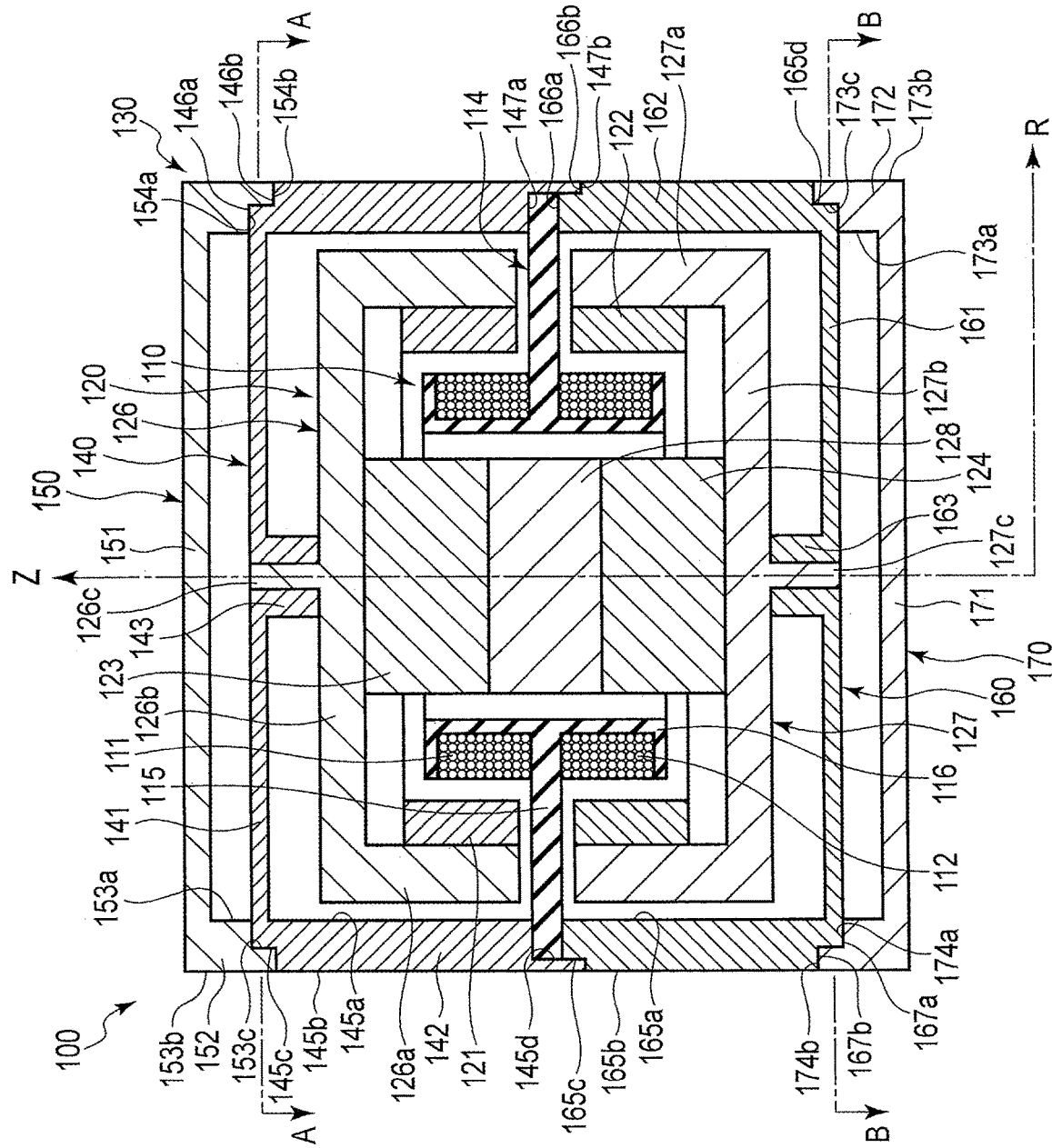
FIG. 1 is a cross-sectional view schematically showing a vibration generator according to a first embodiment.
Figure 2:
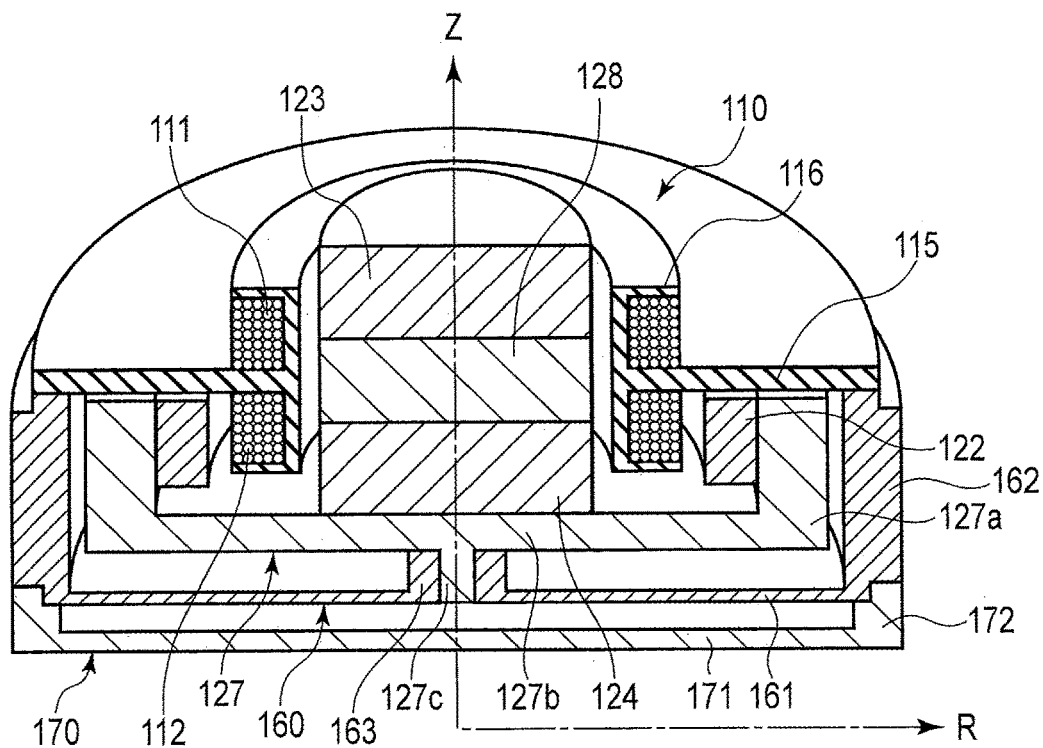
FIG. 2 is a partial cross-sectional perspective view of the vibration generator according to the first embodiment shown in FIG. 1, from which a top part housing and an upper side integrated elastic support body are removed.
Figure 3:
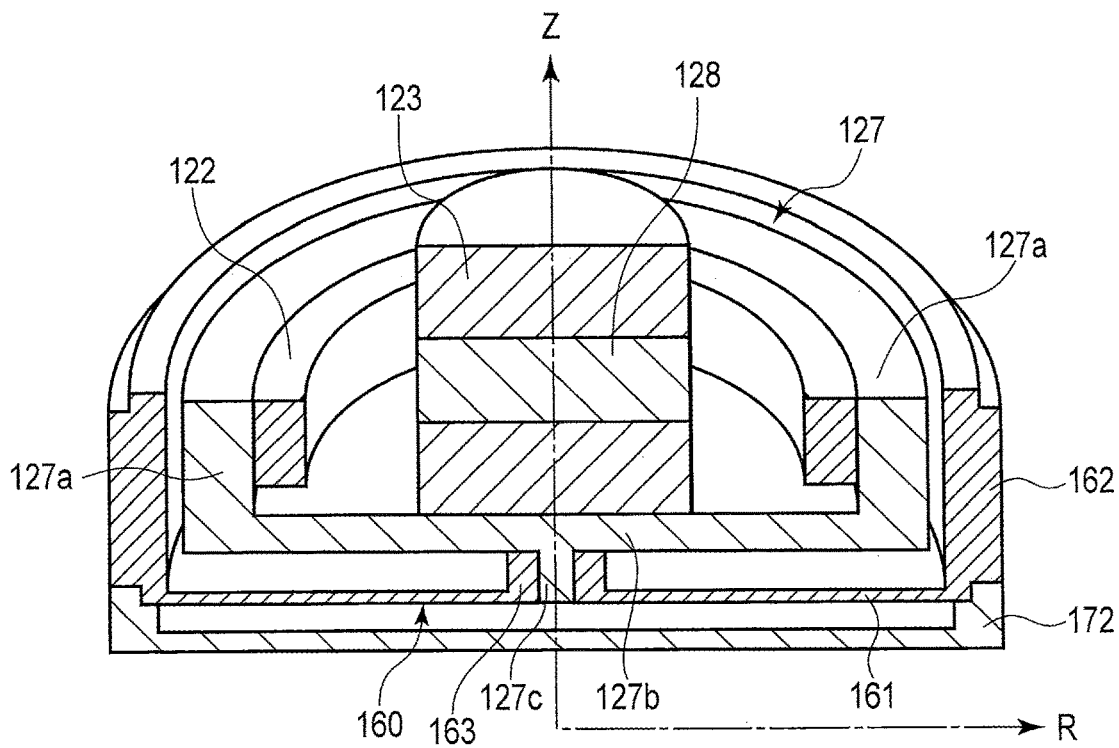
FIG. 3 is a partial cross-sectional perspective view of the vibration generator according to the first embodiment shown in FIG. 1, from which the top part housing, the upper side integrated elastic support body, and a stator are removed.

A vibration generator 100 according to a first embodiment will be explained with reference to FIG. 1 to FIG. 3. FIG. 1 is a cross-sectional view of the vibration generator 100. FIG. 2 and FIG. 3 are partial cross-sectional perspective views of the vibration generator 100. For the sake of convenience, the vibration generator 100 will be explained by setting cylindrical coordinates in the manner shown in FIG. 1. In the following explanation, a +Z side or a +Z direction will be referred to as an upper side or upward, and a −Z side or a −Z direction will be referred to as a lower side or downward.

The vibration generator 100 comprises a housing 130, a vibrator 120 supported so as to vibrate in the housing 130, and a stator 110 supported immovably in the housing 130. The vibration generator 100 also comprises an upper side integrated elastic support body 140, a top part housing 150, a lower side integrated elastic support body 160, and a bottom part housing 170.

The housing 130 has a columnar shape appearance. The housing 130 is configured by a part of the upper side integrated elastic support body 140, the top part housing 150, a part of the lower side integrated elastic support body 160, and the bottom part housing 170.

The integrated elastic support bodies 140 and 160 have elastic beam parts 141 and 161, cylindrical support parts 142 and 162, and vibrator support parts 143 and 163, respectively. The elastic beam parts 141 and 161, the support parts 142 and 162, and the vibrator support parts 143 and 163 are formed integrally with each other, respectively. For example, the integrated elastic support bodies 140 and 160 are prepared by applying appropriate processing, such as machining or cutting, to one base material.

The elastic beam parts 141 and 161 are continuous with one end parts of the cylindrical support parts 142 and 162, respectively. That is, the elastic beam part 141 of the upper side integrated elastic support body 140 is continuous with an upper end part of the support part 142. The elastic beam part 161 of the lower side integrated elastic support body 160 is continuous with a lower end part of the support part 162.

The vibrator support parts 143 and 163 are both cylindrical. The vibrator support parts 143 and 163 are located at the center of the elastic beam parts 141 and 161, respectively.

Specifically, the vibrator support part 143 of the upper side integrated elastic support body 140 is located on an under surface of the elastic beam part 141. The vibrator support part 163 of the lower side integrated elastic support body 160 is located on a top surface of the elastic beam part 161. The vibrator support parts 143 and 163 support the vibrator 120.

The support parts 142 and 162 and the vibrator support parts 143 and 163 are configured not to undergo substantial deformation. On the other hand, the elastic beam parts 141 and 161 are configured to undergo elastic deformation comparatively easily along a central axis of the integrated elastic support bodies 140 and 160, that is, a Z-axis. That is, the rigidity of the support parts 142 and 162 and the vibrator support parts 143 and 163 against the vibration of the vibrator 120 is respectively higher than the rigidity of the elastic beam parts 141 and 161.

Each of the support parts 142 and 162 has steps on the upper end part and the lower end part. Therefore, the support parts 142 and 162 have inner side upper end surfaces 146a and 166a, outer side upper end surfaces 146b and 166b, inner side lower end surfaces 147a and 167a, and outer side lower end surfaces 147b and 167b, respectively. The inner side upper end surfaces 146a and 166a and the outer side upper end surfaces 146b and 166b are shaped concentrically annular, and the inner side lower end surfaces 147a and 167a and the outer side lower end surfaces 147b and 167b are shaped concentrically annular.

Furthermore, each of the support parts 142 and 162 has four cylindrical surfaces with different radii. That is, the support parts 142 and 162 have inner side cylindrical surfaces 145a and 165a, outer side cylindrical surfaces 145b and 165b, upper side intermediate cylindrical surfaces 145c and 165c, and lower side intermediate cylindrical surfaces 145d and 165d, respectively.

The radii of the upper side intermediate cylindrical surfaces 145c and 165c and the radii of the lower side intermediate cylindrical surfaces 145d and 165d are larger than the radii of the inner side cylindrical surfaces 145a and 165a, and smaller than the radii of the outer side cylindrical surfaces 145b and 165b.

The inner side cylindrical surfaces 145a and 165a face inwards, and the outer side cylindrical surfaces 145b and 165b face outwards. The upper side intermediate cylindrical surfaces 145c and 165c and the lower side intermediate cylindrical surface 165d face outwards, and the lower side intermediate cylindrical surface 145d faces inwards.

The radius of the inner side cylindrical surface 145a and the radius of the inner side cylindrical surface 165a are equal in length, and the radius of the outer side cylindrical surface 145b and the radius of the outer side cylindrical surface 165b are equal in length. The radius of the lower side intermediate cylindrical surface 145d and the radius of the upper side intermediate cylindrical surface 165c are equal in length.

The upper side integrated elastic support body 140 and the lower side integrated elastic support body 160 are fixed to each other by connecting the lower side intermediate cylindrical surface 145d and the upper side intermediate cylindrical surface 165c, and connecting the outer side lower end surface 147b and the outer side upper end surface 166b.

The top part housing 150 and the bottom part housing 170 both have a bottomed cylindrical shape. The top part housing 150 includes a disk-like top plate part 151 and a cylindrical support part 152. The top plate part 151 is continuous with an upper end part of the cylindrical support part 152. The bottom part housing 170 includes a disk-like bottom plate part 171 and a cylindrical support part 172. The bottom plate part 171 is continuous with a lower end part of the cylindrical support part 172.

The top plate part 151 and the support part 152 are formed integrally. The bottom plate part 171 and the support part 172 are formed integrally. For example, the top part housing 150 and the bottom part housing 170 are prepared, respectively, by applying appropriate processing, such as machining or cutting, to one base material. The top part housing 150 and the bottom part housing 170 do not undergo substantial deformation.

The support part 152 of the top part housing 150 has a step on the lower end part. Therefore, the support part 152 has an inner side lower end surface 154a and an outer side lower end surface 154b. The inner side lower end surface 154a and the outer side lower end surface 154b have a concentrically annular shape.

Furthermore, the support part 152 has three cylindrical surfaces with different radii. That is, the support part 152 has an inner side cylindrical surface 153a, an outer side cylindrical surfaces 153b, and an intermediate cylindrical surface 153c. The radius of the intermediate cylindrical surface 153c is larger than the radius of the inner side cylindrical surface 153a, and smaller than the radius of the outer side cylindrical surface 153b. The inner side cylindrical surface 153a and the intermediate cylindrical surface 153c face inwards, and the outer side cylindrical surface 153b faces outwards.

The radius of the outer side cylindrical surface 153b is equal in length to the radius of outer side cylindrical surface 145b of the support part 142 of the upper side integrated elastic support body 140. The radius of the intermediate cylindrical surface 153c is equal in length to the radius of the upper side intermediate cylindrical surface 145c of the support part 142 of the upper side integrated elastic support body 140.

The top part housing 150 is fixed to the upper side integrated elastic support body 140. The intermediate cylindrical surface 153c of the support part 152 of the top part housing 150 is connected to the upper side intermediate cylindrical surface 145c of the support part 142 of the upper side integrated elastic support body 140. The inner side lower end surface 154a and the outer side lower end surface 154b of the support part 152 of the top part housing 150 are connected to the inner side upper end surface 146a and the outer side upper end surface 146b of the support part 142 of the upper side integrated elastic support body 140, respectively.

The support part 172 of the bottom part housing 170 has a step on the upper end part. Therefore, the support part 172 has an inner side upper end surface 174a and an outer side upper end surface 174b. The inner side upper end surface 174a and the outer side upper end surface 174b have a concentrically annular shape.

Furthermore, the support part 172 has three cylindrical surfaces with different radii. That is, the support part 172 has an inner side cylindrical surface 173a, an outer side cylindrical surface 173b, and an intermediate cylindrical surface 173c. The radius of the intermediate cylindrical surface 173c is larger than the radius of the inner side cylindrical surface 173a, and smaller than the radius of the outer side cylindrical surface 173b. The inner side cylindrical surface 173a and the intermediate cylindrical surface 173c face inwards, and the outer side cylindrical surface 173b faces outwards.

The radius of the outer side cylindrical surface 173b is equal in length to the radius of outer side cylindrical surface 165b of the support part 162 of the lower side integrated elastic support body 160. The radius of the intermediate cylindrical surface 173c is equal in length to the radius of the lower side intermediate cylindrical surface 165d of the support part 162 of the lower side integrated elastic support body 160.

The bottom part housing 170 is fixed to the lower side integrated elastic support body 160. The intermediate cylindrical surface 173c of the support part 172 of the bottom part housing 170 is connected to the lower side intermediate cylindrical surface 165d of the support part 162 of the lower side integrated elastic support body 160. The inner side upper end surface 174a and the outer side upper end surface 174b of the support part 172 of the bottom part housing 170 are connected to the inner side lower end surface 167a and the outer side lower end surface 167b of the support part 162 of the lower side integrated elastic support body 160, respectively.

The top part housing 150, the upper side integrated elastic support body 140, the lower side integrated elastic support body 160, and the bottom part housing 170, which are connected to each other in the above manner, configure the housing 130. Specifically, the top part housing 150, the support part 142 of the upper side integrated elastic support body 140, the support part 162 of the lower side integrated elastic support body 160, and the bottom part housing 170 configure the housing 130. The top part housing 150, the support parts 142 and 162 of the integrated elastic support bodies 140 and 160, and the bottom part housing 170 form the outermost boundaries of the housing 130.

The vibrator 120 comprises four magnets 121, 122, 123, and 124, and three yokes 126, 127, and 128. That is, the vibrator 120 comprises an outer side upper side magnet 121, an outer side lower side magnet 122, an inner side upper side magnet 123, an inner side lower side magnet 124, an upper side yoke 126, a lower side yoke 127, and an intermediate yoke 128. The yokes 126, 127, and 128 are magnetic materials.

The upper side yoke 126 and the lower side yoke 127 are both bottomed and cylindrical. That is, the yokes 126 and 127 include cylindrical parts 126a and 127a and flat plate parts 126b and 127b that are continuous with one end parts of the cylindrical parts 126a and 127a, respectively. The upper side yoke 126 is arranged inside the housing 130 with the flat plate part 126b at the top. The lower side yoke 127 is arranged inside the housing 130 with the flat plate part 127b at the bottom.

Also, the yokes 126 and 127 respectively include fixing parts 126c and 127c that are fixed to the vibrator support parts 143 and 163 of the integrated elastic support bodies 140 and 160. The fixing parts 126c and 127c are both columnar. The fixing part 126c is located at the center on the upper side of the flat plate part 126b. The fixing part 127c is located at the center on the lower side of the flat plate part 127b.

The cylindrical parts 126a and 127a, the flat plate parts 126b and 127b, and the fixing parts 126c and 127c are formed integrally. For example, the yokes 126 and 127 are prepared, respectively, by applying appropriate processing, such as machining or cutting, to one base material. The yokes 126 and 127 do not undergo substantial deformation.

The outer side magnets 121 and 122 are both cylindrical. The outer side magnets 121 and 122 are fixed to the inner side peripheral surfaces of the cylindrical parts 126a and 127a of the yokes 126 and 127, respectively. Specifically, the outer side upper side magnet 121 is fixed to the lower end part of the cylindrical part 126a of the upper side yoke 126. The outer side lower side magnet 122 is fixed to the upper end part of the cylindrical part 127a of the lower side yoke 127.

The inner side upper side magnet 123, the inner side lower side magnet 124, and the intermediate yoke 128 are all columnar. For example, the radii of the inner side upper side magnet 123, the inner side lower side magnet 124, and the intermediate yoke 128 are equal in length. The inner side upper side magnet 123 is fixed to the upper end of the intermediate yoke 128, and the inner side lower side magnet 124 is fixed to the lower end of the intermediate yoke 128.

Furthermore, the inner side upper side magnet 123 is fixed at the center of the flat plate part 126b of the upper side yoke 126. The inner side lower side magnet 124 is fixed at the center of the flat plate part 127b of the lower side yoke 127. The upper side yoke 126 and the lower side yoke 127 are connected to each other by the inner side upper side magnet 123, the inner side lower side magnet 124, and the intermediate yoke 128, with a certain clearance therebetween.

The fixing parts 126c and 127c of the yokes 126 and 127 are inserted into through holes of the vibrator support parts 143 and 163 of the integrated elastic support bodies 140 and 160, and are fixed to the vibrator support parts 143 and 163, respectively. Therefore, the vibrator 120 is interposed between the integrated elastic support bodies 140 and 160, and is supported inside the housing 130 so as to vibrate freely along the Z-axis.

The stator 110 includes two coils 111 and 112, and a coil support body 114 for supporting the coils 111 and 112. That is, the stator 110 includes an upper side coil 111, a lower side coil 112, and the coil support body 114.

The coil support body 114 includes a support part 115 and a coil fixing part 116. The support part 115 has an annular plate-like shape. The coil fixing part 116 has a shape in which an annular plate is provided on both ends of the cylinder. A center portion of the coil fixing part 116 is continuous with the inner side end of the support part 115. The coil fixing part 116 forms a pair of cylindrical grooves in cooperation with the support part 115.

The coil support body 114 has electrical insulation properties. For example, the support part 115 and the coil fixing part 116 are formed integrally by an electrical insulation material.

The coils 111 and 112 are respectively wound on a pair of grooves formed by the support part 115 and the coil fixing part 116. The coils 111 and 112 are wound cylindrically. Although not shown, the ends of the coils 111 and 112 are drawn outside the vibration generator 100 through the inside of the support part 115.

The outer periphery of the support part 115 of the coil support body 114 is fixed to the upper side integrated elastic support body 140 and the lower side integrated elastic support body 160. Specifically, the outer periphery of the support part 115 is sandwiched and held between the inner side lower end surface 147a of the support part 142 of the upper side integrated elastic support body 140 and the inner side upper end surface 166a of the support part 162 of the lower side integrated elastic support body 160.

The annular support part 115 is extended through the clearance between the upper side yoke 126 and the lower side yoke 127. Therefore, the upper side coil 111 and the lower side coil 112 are located inside the vibrator 120.

The upper side coil 111 faces the outer side upper side magnet 121, and the lower side coil 112 faces the outer side lower side magnet 122. Specifically, the outer peripheral surface of the upper side coil 111 faces the inner peripheral surface of the outer side upper side magnet 121, and the outer peripheral surface of the lower side coil 112 faces the inner peripheral surface of the outer side lower side magnet 122.

Elements of the vibration generator 100 are fixed to each other by well-known means, such as bonding, press-fitting, shrink fitting, welding, and screwing.

In the vibration generator 100, the vibrator 120 is supported inside the housing 130 by the upper side integrated elastic support body 140 and the lower side integrated elastic support body 160 so as to vibrate freely along the Z-axis. Furthermore, the upper side coil 111 and the lower side coil 112 are supported immovably inside the vibrator 120. The outer side upper side magnet 121 and the inner side upper side magnet 123 generate a magnetic field that penetrates the upper side coil 111. Furthermore, the outer side lower side magnet 122 and the inner side lower side magnet 124 generate a magnetic field that penetrates the lower side coil 112.

When the vibrator 120 vibrates along the Z-axis, the outer side upper side magnet 121, the inner side upper side magnet 123, the outer side lower side magnet 122, and the inner side lower side magnet 124 move in reciprocation along the Z-axis with respect to the upper side coil 111 and the lower side coil 112. Therefore, the magnetic fields penetrating the upper side coil 111 and the lower side coil 112 change. In this manner, an electric current flows through each of the upper side coil 111 and the lower side coil 112. As a result, an induced electromotive force is generated between both ends of the upper side coil 111 drawn out from the vibration generator 100. In the same manner, an induced electromotive force is generated between both ends of the lower side coil 112 drawn out from the vibration generator 100. That is, electric power is generated.

In the integrated elastic support bodies 140 and 160 of the vibration generator 100 according to the present embodiment, the elastic beam parts 141 and 161, the support parts 142 and 162, and the vibrator support parts 143 and 163 are formed integrally with each other, respectively.

In a different case where a vibration generator is configured by elastic beam parts and support parts of different members, when a vibrator vibrates and slippage occurs between the elastic beam parts and the support parts at contact surfaces thereof, friction occurs, causing significant attenuation of the vibration of the vibrator. In other words, a mechanical attenuation rate of the vibration of the vibrator increases.

However, in the vibration generator 100 according to the present embodiment, since the elastic beam parts 141 and 161 are formed integrally with the support parts 142 and 162, respectively, frictional force would not occur between elastic beam parts 141 and 161 and the support parts 142 and 162, which would prevent undesirable attenuation of vibration of the vibrator 120. That is, the mechanical attenuation rate of the vibration of the vibrator 120 is kept small. This allows the vibration generator 100 to achieve high power generating performance.

Figure 4:
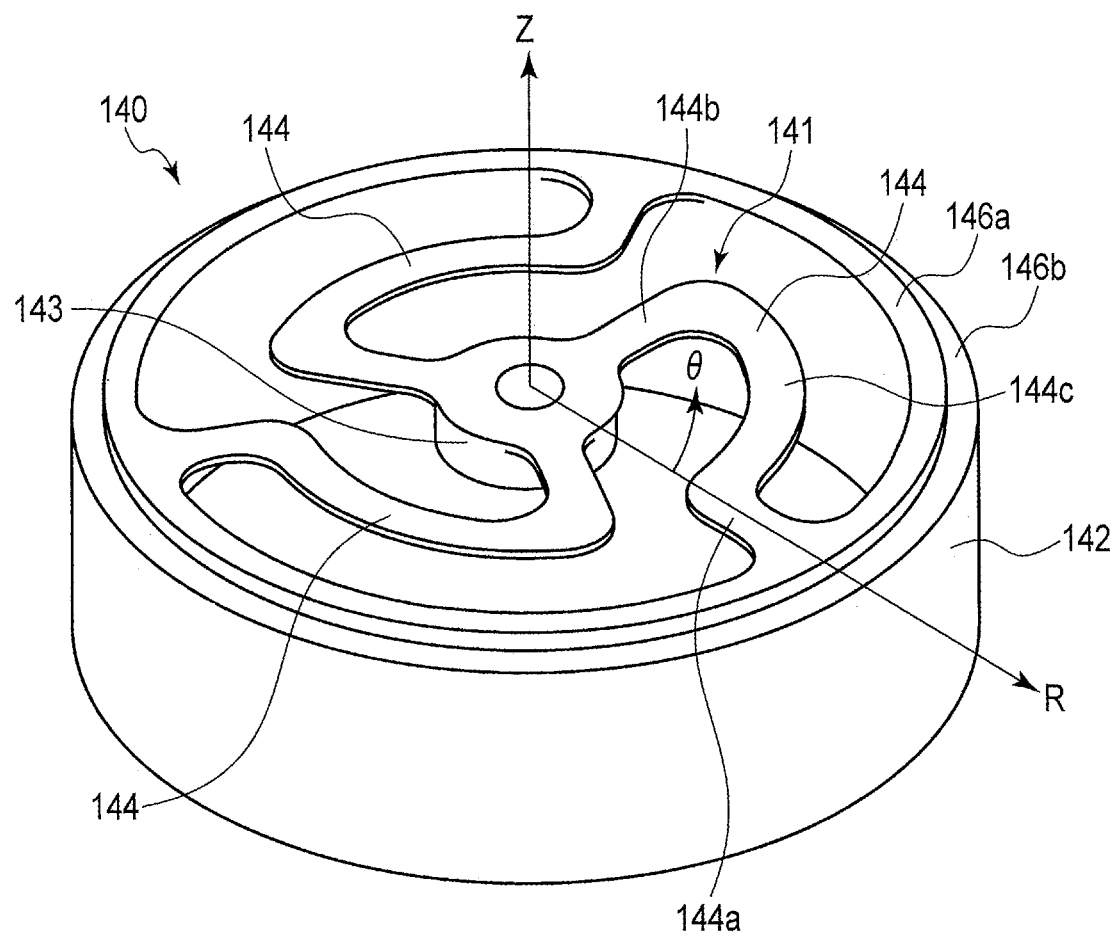
FIG. 4 is a perspective view schematically showing the upper side integrated elastic support body according to the first embodiment shown in FIG. 1.
Figure 5:
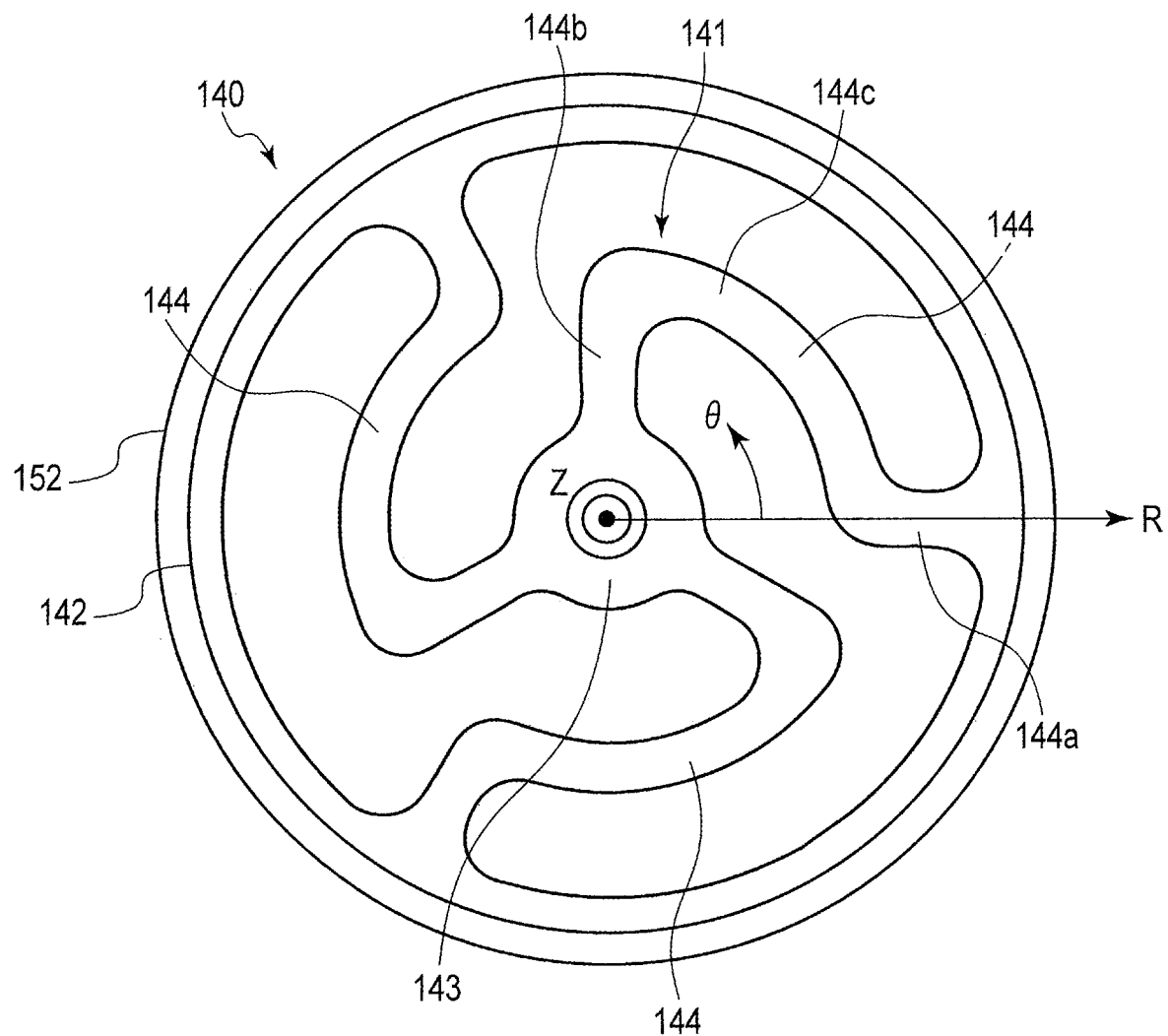
FIG. 5 is a cross-sectional view of the vibration generator according to the first embodiment taken along line A-A shown in FIG. 1.
Figure 6:
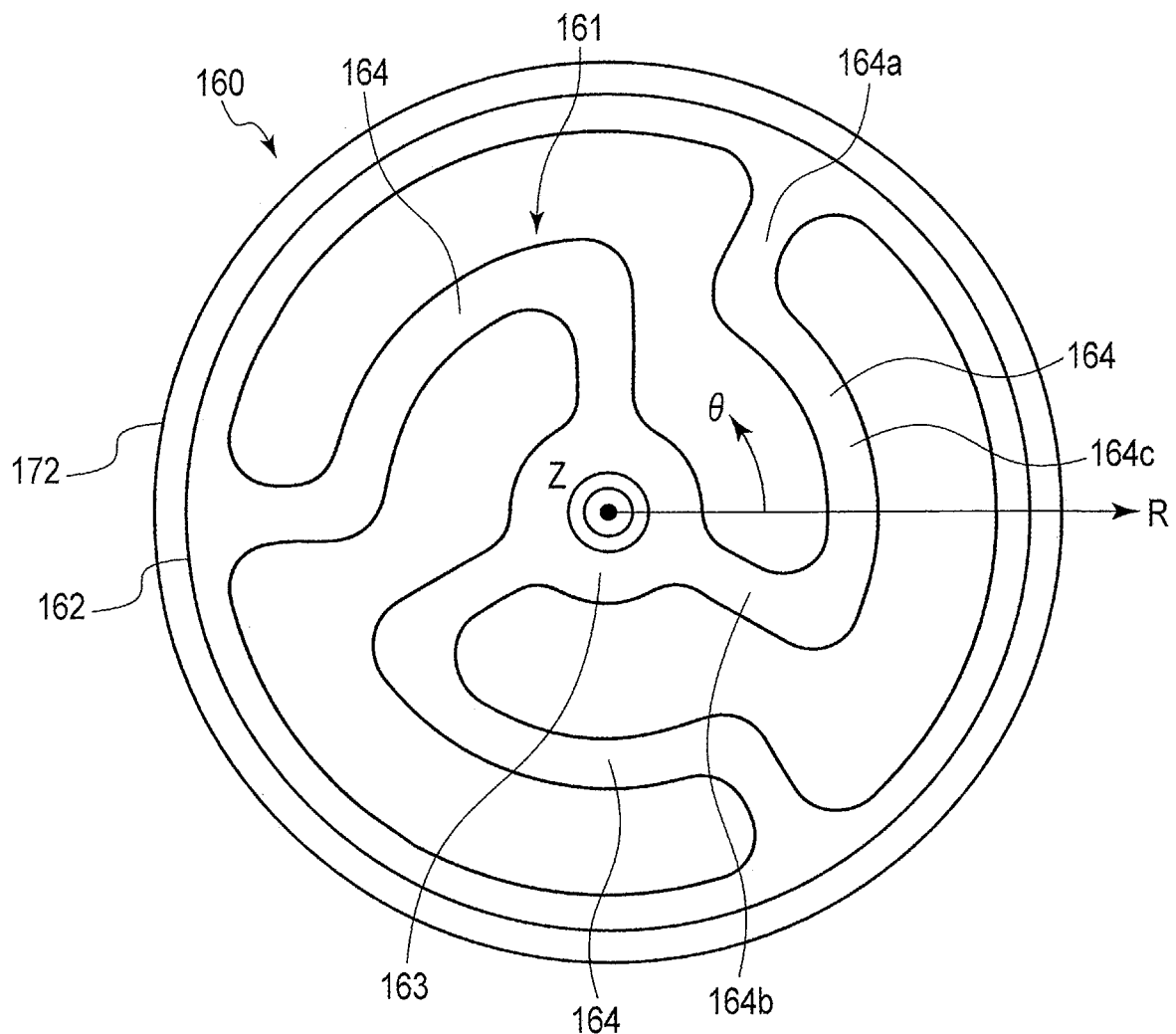
FIG. 6 is a cross-sectional view of the vibration generator according to the first embodiment taken along line B-B shown in FIG. 1.
Figure 7:
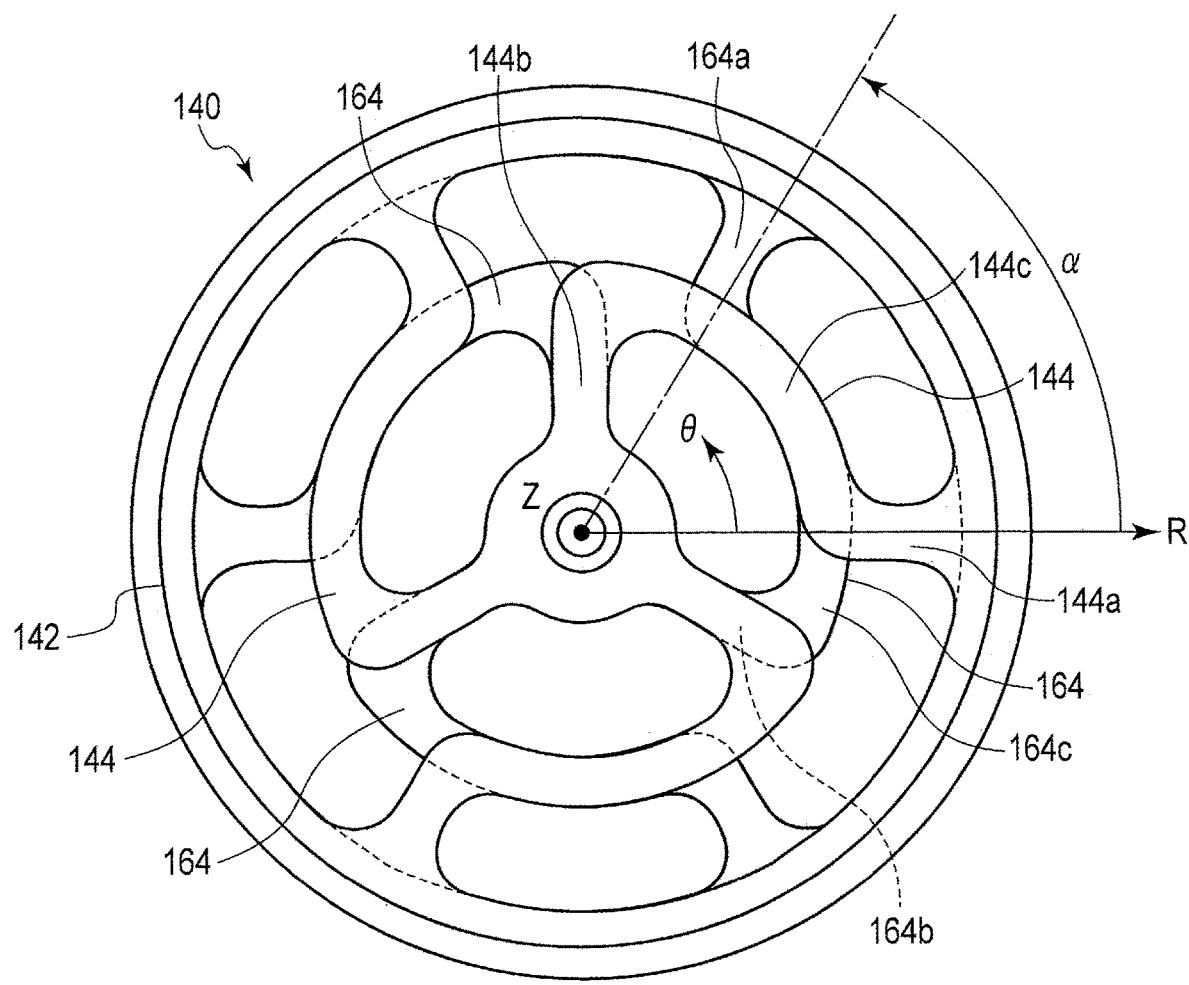
FIG. 7 is a diagram in which an elastic beam part shown in FIG. 5 and an elastic beam part shown in FIG. 6 according to the first embodiment are depicted in an overlapping manner.

Hereinafter, the upper side integrated elastic support body 140 and the lower side integrated elastic support body 160 will be explained in detail with reference to FIG. 4 to FIG. 7. FIG. 4 is a perspective view of the upper side integrated elastic support body 140. FIG. 5 and FIG. 6 are cross-sectional views of the vibration generator 100 taken along line A-A and line B-B shown in FIG. 1. In FIG. 5 and FIG. 6, a hatch pattern is omitted for convenience sake. FIG. 7 is a diagram in which the elastic beam part 141 shown in FIG. 5 and the elastic beam part 161 shown in FIG. 6 are depicted in an overlapping manner. In these drawings, as viewed from the +Z side, an angular direction, that is, a θ direction, is described as a +θ direction for a counterclockwise direction, and a −θ direction for a clockwise direction about the +Z axis.

The elastic beam parts 141 and 161 have three letter 'S' shaped beam elastic parts 144 and 164, respectively. Although the shapes of the beam elastic parts 144 and 164 are not precisely the same as the letter S, here, for convenience sake, the beam elastic parts 144 and 164 will be referred to as S-letter beam elastic parts 144 and 164.

The elastic beam parts 141 and 161 respectively having the three S-letter beam elastic parts 144 and 164 in this manner support the vibrator 120 so as to be vibrated easier than in the case of elastic beam parts configured merely by a disk.

The elastic beam parts 141 and 161 having three S-letter beam elastic parts 144 and 164, respectively, are merely an example. The number of S-letter beam elastic parts 144 and 164 is not limited to three. The elastic beam parts 141 and 161 may have four or more S-letter beam elastic parts 144 and 164, respectively.

The three S-letter beam elastic parts 144 and 164 are arranged with an equal angular interval, respectively. That is, the three S-letter beam elastic parts 144 and 164 are located 120 degrees apart from each other in the angular direction, respectively.

Each of the S-letter beam elastic parts 144 and 164 has outer side end parts 144a and 164a that are fixed to the support parts 142 and 162, inner side end parts 144b and 164b that are fixed to the vibrator support parts 143 and 163, and intermediate parts 144c and 164c that extend between the outer side end parts 144a and 164a and the inner side end parts 144b and 164b, respectively. The intermediate parts 144c and 164c extend about in the angular direction.

The outer side end parts 144a and 164a extend inwards from the support parts 142 and 162, respectively, in a radial direction. The inner side end parts 144b and 164b extend outwards from the vibrator support parts 143 and 163, respectively, in a radial direction. The angular positions of the outer side end parts 144a and 164a are respectively different from the angular positions of the inner side end parts 144b and 164b.

In the S-letter beam elastic parts 144 and 164 configured in this manner, paths from the outer side end parts 144a and 164a to the inner side end parts 144b and 164b through the intermediate parts 144c and 164c are longer than paths extending straight from the support parts 142 and 162 to the vibrator support parts 143 and 163. Therefore, the elastic beam parts 141 and 161 including the S-letter beam elastic parts 144 and 164, respectively, support the vibrator 120 in a manner to be vibrated easier than in the case of elastic beam parts including linear beam elastic members.

As shown in FIG. 5, in the S-letter beam elastic part 144 of the upper side integrated elastic support body 140, the angular position of the inner side end part 144b is located on the +θ side with respect to the angular position of the outer side end part 144a. In other words, the intermediate part 144c of the S-letter beam elastic part 144 extends in the +θ direction from the outer side end part 144a to the inner side end part 144b.

As shown in FIG. 6, in the S-letter beam elastic part 164 of the lower side integrated elastic support body 160, the angular position of the inner side end part 164b is located on the −θ side with respect to the angular position of the outer side end part 164a. In other words, the intermediate part 164c of the S-letter beam elastic part 164 extends in the −θ direction from the outer side end part 164a to the inner side end part 164b.

In the S-letter beam elastic part 144 of the elastic beam part 141 of the upper side integrated elastic support body 140 and the S-letter beam elastic part 164 of the elastic beam part 161 of the lower side integrated elastic support body 160, the positional relationships between the outer side end parts 144a and 164a, the inner side end parts 144b and 164b, and the intermediate parts 144c and 164c are respectively opposite in the angular direction. That is, the S-letter beam elastic part 144 and the S-letter beam elastic part 164 have line-symmetric shapes with respect to an R-axis. In other words, the elastic beam part 141 including the three S-letter beam elastic parts 144 has the same shape as that of the elastic beam part 161 including the three S-letter beam elastic parts 164 being rotated 180 degrees about the R-axis, regardless of angular position.

As shown in FIG. 7, the elastic beam part 141 and the elastic beam part 161 are arranged in a manner such that, when being projected onto a flat surface that is perpendicular to the Z-axis, the outer side end part 144a and the inner side end part 144b of the S-letter beam elastic part 144 does not overlap with the outer side end part 164a and the inner side end part 164b of the S-letter beam elastic part 164, respectively. The outer side end part 164a of the S-letter beam elastic part 164 is shifted by α in the angular direction with respect to the outer side end part 144a of the S-letter beam elastic part 144. For example, α is 60 degrees. In this case, the outer side end parts 144a and 164a of the S-letter beam elastic parts 144 and 164 are arranged to be spaced apart evenly in the angular direction.

The arrangement in which the outer side end parts 144a and 164a are spaced apart evenly favorably suppresses the occurrence of undesired transverse vibrations of the vibrator 120, that is, vibrations in a direction perpendicular to the Z-axis.

The rigidity of the elastic beam parts 141 and 161 including the three S-letter beam elastic parts 144 and 164 about the Z-axis differs between the +θ direction and the −θ direction. For example, in the S-letter beam elastic part 144, as shown in FIG. 5, since the outer side end part 144a is located on the −θ side of the inner side end part 144b, the rigidity of the elastic beam part 141 about the Z-axis is higher in the +θ direction than in the −θ direction. On the other hand, in the S-letter beam elastic part 164, as shown in FIG. 6, since the outer side end part 164a is located on the +θ side of the inner side end part 164b, the rigidity of the elastic beam part 161 about the Z-axis is higher in the −θ direction than in the +θ direction.

As shown in FIG. 7, when being projected onto a flat surface that is perpendicular to the Z-axis, the elastic beam part 141 and the elastic beam part 161 are in a reversed arrangement relation. Therefore, the rotation of the vibrator 120 about the Z-axis in the −θ direction, where the rigidity of the elastic beam part 141 about the Z-axis is low, is suppressed by the elastic beam part 161, whose rigidity in the −θ direction about the Z-axis is high. Contrarily, the rotation of the vibrator 120 about the Z-axis in the +θ direction, where the rigidity of the elastic beam part 161 about the Z-axis is low, is suppressed by the elastic beam part 141, whose rigidity in the +θ direction about the Z-axis is high. In this manner, the occurrence of undesirable rotation of the vibrator 120 about the Z-axis is favorably suppressed.

Therefore, according to the present embodiment, the vibration generator 100 with low mechanical attenuation and high power generating performance is provided.

Second Embodiment

Figure 8:
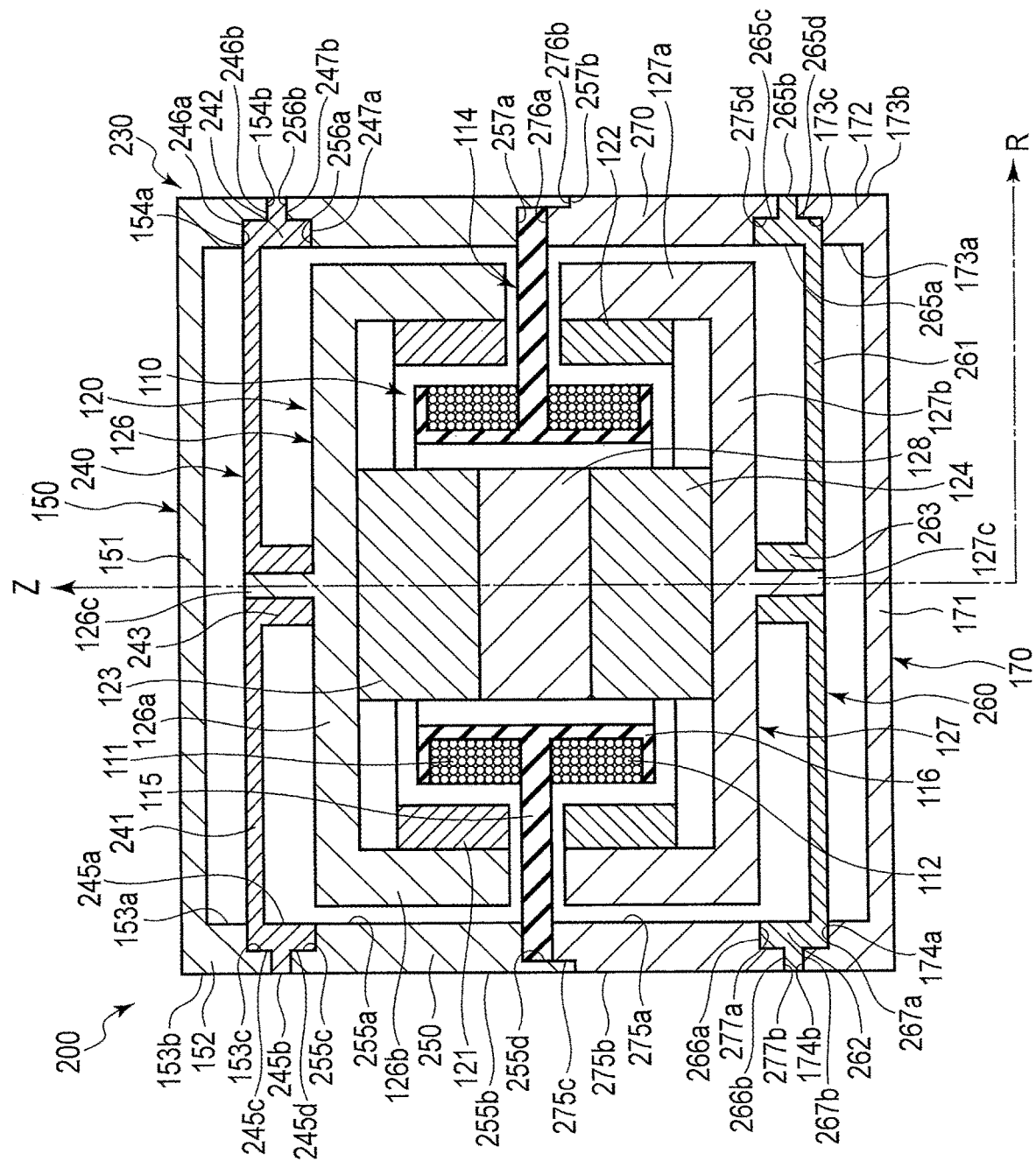
FIG. 8 is a cross-sectional view schematically showing a vibration generator according to a second embodiment.

A vibration generator 200 according to a second embodiment will be explained with reference to FIG. 8. FIG. 8 is a cross-sectional view of the vibration generator 200. In FIG. 8, members denoted by the same reference symbols as those denoted for the members shown in FIG. 1 are the same members, and detailed explanations thereof will be omitted. Hereinafter, different portions will be explained in detail. That is, portions that are not explained below are the same as those in the first embodiment.

The vibration generator 200 comprises a housing 230, a vibrator 120 supported so as to vibrate in the housing 230, and a stator 110 supported immovably in the housing 230. The vibration generator 200 also comprises an upper side integrated elastic support body 240, an upper side cylindrical housing 250, a top part housing 150, a lower side integrated elastic support body 260, a lower side cylindrical housing 270, and a bottom part housing 170.

In other words, the vibration generator 200 has a configuration in which the upper side integrated elastic support body 140 in the vibration generator 100 is replaced by the upper side integrated elastic support body 240 and the upper side cylindrical housing 250, and the lower side integrated elastic support body 160 in the vibration generator 100 is replaced by the lower side integrated elastic support body 260 and the lower side cylindrical housing 270.

The integrated elastic support bodies 240 and 260 have elastic beam parts 241 and 261, cylindrical support parts 242 and 262, and vibrator support parts 243 and 263, respectively. The elastic beam parts 241 and 261, the support parts 242 and 262, and the vibrator support parts 243 and 263 are formed integrally with each other, respectively.

The elastic beam parts 241 and 261 are continuous with one end parts of the cylindrical support parts 242 and 262, respectively. The vibrator support parts 243 and 263 are continuous with the center of the elastic beam parts 241 and 261, respectively. Details of the elastic beam parts 241 and 261 and the vibrator support parts 243 and 263 are the same as those of the elastic beam parts 141 and 161 and the vibrator support parts 143 and 163 of the first embodiment.

Each of the support parts 242 and 262 has steps on the upper end part and the lower end part. Therefore, the support parts 242 and 262 have inner side upper end surfaces 246a and 266a, outer side upper end surfaces 246b and 266b, inner side lower end surfaces 247a and 267a, and outer side lower end surfaces 247b and 267b, respectively.

Furthermore, each of the support parts 242 and 262 has four cylindrical surfaces with different radii. That is, the support parts 242 and 262 have inner side cylindrical surfaces 245a and 265a, outer side cylindrical surfaces 245b and 265b, upper side intermediate cylindrical surfaces 245c and 265c, and lower side intermediate cylindrical surfaces 245d and 265d, respectively.

The radii of the upper side intermediate cylindrical surfaces 245c and 265c and the radii of the lower side intermediate cylindrical surfaces 245d and 265d are larger than the radii of the inner side cylindrical surfaces 245a and 265a, and smaller than the radii of the outer side cylindrical surfaces 245b and 265b.

The inner side cylindrical surfaces 245a and 265a face inwards, and the outer side cylindrical surfaces 245b and 265b, the upper side intermediate cylindrical surfaces 245c and 265c, and the lower side intermediate cylindrical surfaces 245d and 265d face outwards.

The radius of the upper side intermediate cylindrical surface 245c of the support part 242 and the radius of an intermediate cylindrical surface 153c of the top part housing 150 are equal in length. The top part housing 150 is fixed to the upper side integrated elastic support body 140. The intermediate cylindrical surface 153c of a support part 152 of the top part housing 150 is connected to the upper side intermediate cylindrical surface 245c of the support part 242 of the upper side integrated elastic support body 240. An inner side lower end surface 154a and an outer side lower end surface 154b of the support part 152 of the top part housing 150 are connected to the inner side upper end surface 246a and the outer side upper end surface 246b of the support part 242 of the upper side integrated elastic support body 240, respectively.

The radius of the lower side intermediate cylindrical surface 265d of the support part 262 and the radius of an intermediate cylindrical surface 173c of the bottom part housing 170 are equal in length. The bottom part housing 170 is fixed to the lower side integrated elastic support body 260. The intermediate cylindrical surface 173c of a support part 172 of the bottom part housing 170 is connected to the lower side intermediate cylindrical surface 265d of the support part 262 of the lower side integrated elastic support body 260. An inner side upper end surface 174a and an outer side upper end surface 174b of the support part 172 of the bottom part housing 170 are connected to the inner side lower end surface 267a and the outer side lower end surface 267b of the support part 262 of the lower side integrated elastic support body 260, respectively.

The cylindrical housings 250 and 270 are both cylindrical. Each of the cylindrical housings 250 and 270 has steps on the upper end part and the lower end part. Therefore, the cylindrical housings 250 and 270 have inner side upper end surfaces 256a and 276a, outer side upper end surfaces 256b and 276b, inner side lower end surfaces 257a and 277a, and outer side lower end surfaces 257b and 277b, respectively.

Furthermore, each of the cylindrical housings 250 and 270 has four cylindrical surfaces with different radii. That is, the cylindrical housings 250 and 270 have inner side cylindrical surfaces 255a and 275a, outer side cylindrical surfaces 255b and 275b, upper side intermediate cylindrical surfaces 255c and 275c, and lower side intermediate cylindrical surfaces 255d and 275d, respectively.

The radii of the upper side intermediate cylindrical surfaces 255c and 275c and the radii of the lower side intermediate cylindrical surfaces 255d and 275d are larger than the radii of the inner side cylindrical surfaces 255a and 275a, and smaller than the radii of the outer side cylindrical surfaces 255b and 275b.

The inner side cylindrical surfaces 255a and 275a face inwards, and the outer side cylindrical surfaces 255b and 275b face outwards. The upper side intermediate cylindrical surfaces 255c and the lower side intermediate cylindrical surface 255d and 275d face inwards, and the upper side intermediate cylindrical surface 275c faces outwards.

The radius of the upper side intermediate cylindrical surface 255c of the upper side cylindrical housing 250 is equal in length to the radius of the lower side intermediate cylindrical surface 245d of the upper side integrated elastic support body 240. The upper side cylindrical housing 250 is fixed to the upper side integrated elastic support body 240. The upper side intermediate cylindrical surface 255c of the upper side cylindrical housing 250 is connected to the lower side intermediate cylindrical surface 245d of the upper side integrated elastic support body 240. Furthermore, the inner side upper end surface 256a and the outer side upper end surface 256b of the upper side cylindrical housing 250 are connected to the inner side lower end surface 247a and the outer side lower end surface 247b of the upper side integrated elastic support body 240, respectively.

The upper side cylindrical housing 250 and the upper side integrated elastic support body 240 fixed to each other configure a structure substantially the same as that of the upper side integrated elastic support body 140 of the first embodiment. Therefore, details of the upper side cylindrical housing 250 and the upper side integrated elastic support body 240 fixed to each other are the same as those of the upper side integrated elastic support body 140 of the first embodiment.

The radius of the lower side intermediate cylindrical surface 275d of the lower side cylindrical housing 270 is equal in length to the radius of the upper side intermediate cylindrical surface 265c of the lower side integrated elastic support body 260. The lower side cylindrical housing 270 is fixed to the lower side integrated elastic support body 260. The lower side intermediate cylindrical surface 275d of the lower side cylindrical housing 270 is connected to the upper side intermediate cylindrical surface 265c of the lower side integrated elastic support body 260. Furthermore, the inner side lower end surface 277a and the outer side lower end surface 277b of the lower side cylindrical housing 270 are connected to the inner side upper end surface 266a and the outer side upper end surface 266b of the lower side integrated elastic support body 260, respectively.

The lower side cylindrical housing 270 and the lower side integrated elastic support body 260 fixed to each other configure a structure substantially the same as that of the lower side integrated elastic support body 160 of the first embodiment. Therefore, details of the lower side cylindrical housing 270 and the lower side integrated elastic support body 260 fixed to each other are the same as those of the lower side integrated elastic support body 160 of the first embodiment.

The upper side cylindrical housing 250 is fixed to the lower side cylindrical housing 270.

The radius of the lower side intermediate cylindrical surface 255d of the upper side cylindrical housing 250 is equal in length to the radius of the upper side intermediate cylindrical surface 275c of the lower side cylindrical housing 270. The upper side cylindrical housing 250 is fixed to the lower side cylindrical housing 270. The lower side intermediate cylindrical surface 255d of the upper side cylindrical housing 250 is connected to the upper side intermediate cylindrical surface 275c of the lower side cylindrical housing 270. Furthermore, the outer side lower end surface 257b of the upper side cylindrical housing 250 is connected to the outer side upper end surface 276b of the lower side cylindrical housing 270. The outer periphery of a support part 115 of the stator 110 is sandwiched and held between the inner side lower end surface 257a of the upper side cylindrical housing 250 and the inner side upper end surface 276a of the lower side cylindrical housing 270.

The top part housing 150, the upper side integrated elastic support body 240, the upper side cylindrical housing 250, the lower side cylindrical housing 270, the lower side integrated elastic support body 260, and the bottom part housing 170, which are connected to each other in the above manner, configure the housing 230. Specifically, the top part housing 150, the support part 242 of the upper side integrated elastic support body 240, the upper side cylindrical housing 250, the lower side cylindrical housing 270, the support part 262 of the lower side integrated elastic support body 260, and the bottom part housing 170 configure the housing 230. The top part housing 150, the support parts 242 and 262 of the integrated elastic support bodies 240 and 260, the cylindrical housings 250 and 270, and the bottom part housing 170 form the outermost boundaries of the housing 230.

The vibration generator 200 according to the present embodiment configured in the above manner has substantially the same configuration and advantage as those of the vibration generator 100 according to the first embodiment.

Now, with reference to FIG. 9 and FIG. 10, a typical manufacturing process of the upper side integrated elastic support body 140 according to the first embodiment and the upper side integrated elastic support body 240 according to the second embodiment will be explained by comparison. FIG. 9 is a diagram schematically showing a main manufacturing process of the integrated elastic support body 140 according to the first embodiment, and FIG. 10 is a diagram schematically showing a main manufacturing process of the upper side integrated elastic support body 240 according to the second embodiment. Although a completed product of each manufactured part is not shown in FIG. 9 and FIG. 10, for convenience sake, each part will be referred to in the manners mentioned above.

The upper side integrated elastic support body 140 and the upper side integrated elastic support body 240 are prepared by applying appropriate processing, such as machining or cutting, to a base material 140A and a base material 240A, respectively.

As shown in FIG. 9, the base material 140A of the upper side integrated elastic support body 140 is a columnar body that is higher than the height of the support part 142 of the upper side integrated elastic support body 140, that is, a height along the Z-axis.

The base material 140A is processed by, first, machining a columnar region M0, then, machining an annular region M1. Subsequently, a columnar region M2 is removed by machining or cutting. Although not shown, subsequently, appropriate machining is applied, and the elastic beam part 141, the support part 142, and the vibrator support part 143 are formed.

On the other hand, as shown in FIG. 10, the base material 240A of the upper side integrated elastic support body 240 is a columnar body that is higher than the height of the support part 242 of the upper side integrated elastic support body 240, that is, a height along the Z-axis. Therefore, the height of the base material 240A is shorter than the height of the base material 140A.

The base material 240A is processed by, first, machining an annular region M1. Subsequently, a columnar region M2 is removed by machining or cutting. Although not shown, subsequently, appropriate machining is applied, and the elastic beam part 241, the support part 242, and the vibrator support part 243 are formed.

As may be understood from the above, in the main manufacturing processes for creating a rough appearance of the upper side integrated elastic support bodies 140 and 240, the base material 140A needs to be processed three times, whereas the base material 240A needs to be processed only twice.

Therefore, the upper side integrated elastic support body 240 according to the second embodiment can be prepared by a smaller number of processes in comparison to the upper side integrated elastic support body 140 according to the first embodiment. Thus, the cost of manufacturing the upper side integrated elastic support body 240 can be reduced in comparison to the upper side integrated elastic support body 140 according to the first embodiment.

According to the vibration generator of at least one embodiment described above, since the elastic beam part and the support part of each of the first and second integrated elastic support bodies are integrally formed, frictional force would not occur between the elastic beam part and the support part, which allows the vibration generator to achieve high power generating performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

The invention claimed is:

1. A vibration generator comprising:
a first integrated elastic support body including a first elastic beam part configured to undergo elastic deformation, and a first support part supporting the first elastic beam part, the first elastic beam part and the first support part being integrally formed;
a second integrated elastic support body including a second elastic beam part configured to undergo elastic deformation, and a second support part supporting the second elastic beam part, the second elastic beam part and the second support part being integrally formed;
a vibrator comprising a magnet and a magnetic material, the vibrator being interposed between the first integrated elastic support body and the second integrated elastic support body, and supported so as to vibrate; and
a coil located inside the vibrator, the coil being supported by a coil support body being interposed and supported between the first integrated elastic support body and the second integrated elastic support body,
wherein the first support part of the first integrated elastic support body and the second support part of the second integrated elastic support body are directly fixed to each other.

2. The vibration generator according to claim 1, wherein each of the first support part of the first integrated elastic support body and the second support part of the second integrated elastic support body has two or more cylindrical surfaces with different radii, and
at least one of the cylindrical surfaces of the first integrated elastic support body is connected to at least one of the cylindrical surfaces of the second integrated elastic support body.

3. The vibration generator according to claim 1, wherein the first support part of the first integrated elastic support body and the second support part of the second integrated elastic support body form an outermost boundary of a housing surrounding the vibrator and the coil.

4. The vibration generator according to claim 1, wherein the first support part of the first integrated elastic support body and the second support part of the second integrated elastic support body form an outermost boundary of a housing surrounding the vibrator and the coil, and
the first integrated elastic support body includes a first vibrator support part fixed to the first elastic beam part and supporting the vibrator, and the second integrated elastic support body includes a second vibrator support part fixed to the second elastic beam part and supporting the vibrator.

5. The vibration generator according to claim 1, wherein the coil is cylindrical, and
the magnet is cylindrical and located outside the coil.

6. The vibration generator according to claim 1, wherein
the coil is cylindrical, and
the magnet is columnar and located inside the coil.

7. The vibration generator according to claim 1, wherein the coil is cylindrical,
the magnet is cylindrical and located outside the coil, and
the vibrator further comprises an additional magnet, the additional magnet being columnar and located inside the coil.

8. The vibration generator according to claim 1, wherein
the first integrated elastic support body includes a first vibrator support part fixed to the first elastic beam part and supporting the vibrator, and the second integrated elastic support body includes a second vibrator support part fixed to the second elastic beam part and supporting the vibrator.

9. The vibration generator according to claim 1, wherein
in the first integrated elastic support body, rigidity of the first support part with respect to vibration of the vibrator is higher than rigidity of the first elastic beam part, and in the second integrated elastic support body, rigidity of the second support part with respect to vibration of the vibrator is higher than rigidity of the second elastic beam part.

10. The vibration generator according to claim 1, wherein
the first elastic beam part is a first S-letter beam elastic part,
the second elastic beam part is a second S-letter beam elastic part, and
the second S-letter beam elastic part is arranged in a 180 degrees rotated manner about an axis perpendicular to a vibration direction of the vibrator with respect to the first S-letter beam elastic part.

11. The vibration generator according to claim 10, wherein
the first S-letter beam elastic part and the second S-letter beam elastic part are arranged in a manner such that, when being projected onto a flat surface that is perpendicular to a vibrating direction of the vibrator, an end part of the first S-letter beam elastic part does not overlap with an end part of the second S-letter beam elastic part.

12. The vibration generator according to claim 10, wherein
the first S-letter beam elastic part and the second S-letter beam elastic part each comprise an outer side end part, an inner side end part, and an intermediate part extending between the outer side end part and the inner side end part, the outer side end part and the inner side end part being formed at different circumferential positions.

* * * * *